March 22, 1927.
A. ARONSON
BUTTER MOLD
Filed March 10, 1926
1,621,822
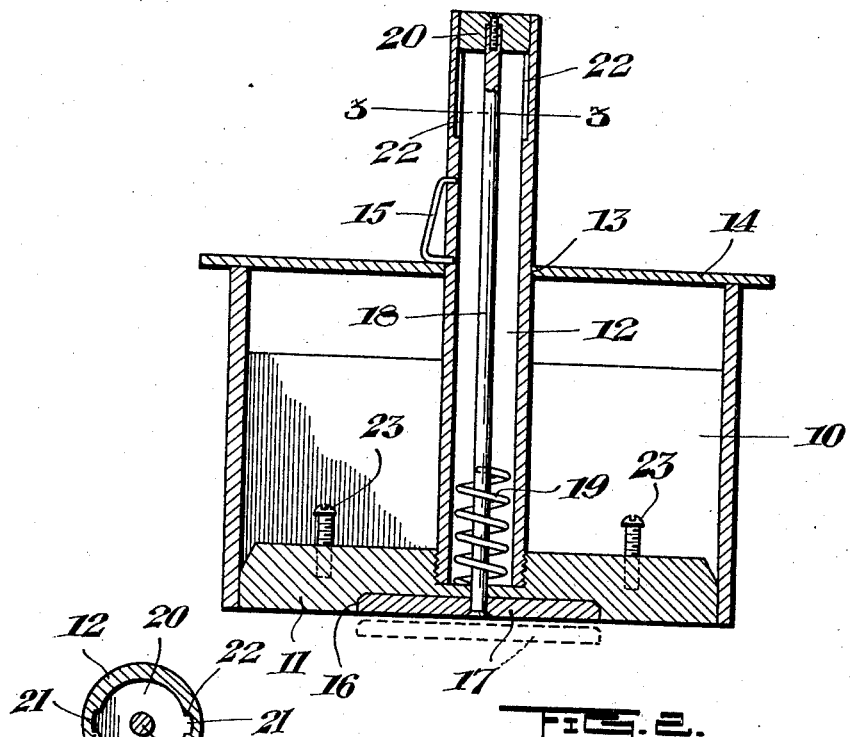
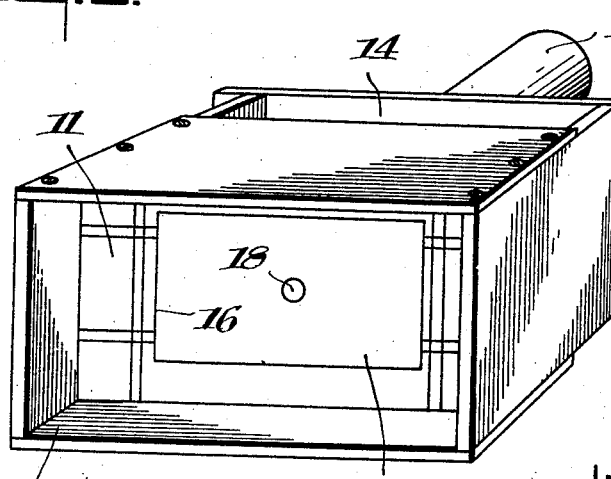
INVENTOR.
ALGOTT ARONSON.
BY Fetherstonhaugh & Co.
ATT'YS.

Patented Mar. 22, 1927.

1,621,822

UNITED STATES PATENT OFFICE.

ALGOTT ARONSON, OF VANTAGE, SASKATCHEWAN, CANADA.

BUTTER MOLD.

Application filed March 10, 1926. Serial No. 93,755.

This invention relates to improvements in butter molds and the objects of the invention are to provide a durable and simply constructed device of this character for delivering a print of butter without being touched by the hand of the operator.

Further objects are to provide an improved butter mold for the more satisfactory marketing of butter without handling it.

With the foregoing and other objects, hereinafter more fully referred to, in view, the invention consists essentially of a mold or casing provided with a plunger member operable from without the casing and having therein a spring actuated pusher plate also operable from without the mold.

Referring now to the drawings in which like characters of reference indicate corresponding parts in each figure, Figure 1 is a perspective view of my improved invention as a whole, Figure 2 is a vertical section and Figure 3 is a section on line 3—3 of Figure 2.

Referring now more particularly to the drawings in which a preferred form of my invention is illustrated, 10 designates a mold or casing of any suitable form or material, adapted to hold, as illustrated in the present example, approximately a pound of butter. Within this mold is a plunger 11, provided with a tubular stem 12 extending through the orifice 13 in the top 14 of the mold and having a suitable stop 15 to limit its downward travel. Mounted in a recess 16 in the underside of the plunger 11 is a plunger plate 17, rigidly engaged to a plunger rod 18 in the tubular stem 12, spring actuated by a coil spring 19.

On the upper end of the rod 18 is a block 20 provided with lugs 21 adapted to slidably engage with grooves 22 in the tubular stem 12 whereby the downward travel of the rod 18 and plunger plate 17 thereon is limited. The plunger 11 is provided with adjusting screws 23 adapted to contact with the upper end 14 of the mold casing.

As many changes could be made in the above construction and many apparently widely different embodiments of my invention, within the scope of the claims, constructed without departing from the spirit or scope thereof, it is intended that all matter contained in the present specification and accompanying drawings shall be interpreted in an illustrative and not in a limiting sense.

What I claim as my invention is:

1. In a device of the character described and in combination, a butter mold comprising a casing, a piston for the casing having a hollow stem protruding beyond the casing, a plunger plate normally held counter-sunk in the piston, a stem for said plate extending through the piston stem, a retaining member carried by the piston stem and adapted to engage with the casing to limit the downward travel of the piston, grooves formed in the piston stem, a combined block and closure member on the plunger stem adapted to engage with said grooves to close the piston stem and to limit the downward travel of the plunger plate, respectively 2. In a device of the character described the combination, with a piston member having a hollow stem, of a spring actuated plunger plate normally held within the piston, a stem for the plunger plate within the piston stem, means on the piston stem for limiting the downward travel of the piston and means in the piston stem and on the plunger stem for closing the piston stem and limiting the downward travel of the plunger, respectively.

In witness whereof I have hereunto set my hand.

ALGOTT ARONSON.